US008665188B2

(12) United States Patent
Yun (10) Patent No.: US 8,665,188 B2
(45) Date of Patent: Mar. 4, 2014

(54) LASER DIODE / LED DRIVE CIRCUIT

(75) Inventor: Yeong Ryong Yun, Incheon (KR)

(73) Assignee: National Semiconductor Corporation, Santa Clara, CA (US)

( * ) Notice: Subject to any disclaimer, the term of this patent is extended or adjusted under 35 U.S.C. 154(b) by 1411 days.

(21) Appl. No.: 12/025,526

(22) Filed: Feb. 4, 2008

(65) Prior Publication Data

US 2009/0195700 A1    Aug. 6, 2009

(51) Int. Cl.
*G09G 3/32* (2006.01)
*G09G 3/30* (2006.01)

(52) U.S. Cl.
USPC .................................. 345/77; 345/76; 345/82

(58) Field of Classification Search
USPC ........ 315/169.1–169.4; 345/76–83, 204–215, 345/690–699
See application file for complete search history.

(56) References Cited

U.S. PATENT DOCUMENTS

| | | | |
|---|---|---|---|
| 4,348,666 A * | 9/1982 | Ogita | 345/39 |
| 4,817,097 A | 3/1989 | Dufour | |
| 6,049,175 A * | 4/2000 | Forsberg | 315/200 A |
| 6,115,152 A * | 9/2000 | Popovich et al. | 359/15 |
| 6,272,160 B1 | 8/2001 | Stronczer | |
| 6,621,235 B2 * | 9/2003 | Chang | 315/216 |
| 6,697,402 B2 * | 2/2004 | Crawford | 372/38.03 |
| 6,914,387 B2 * | 7/2005 | Sato et al. | 315/169.1 |
| 6,995,518 B2 * | 2/2006 | Havlik et al. | 315/169.3 |
| 7,031,359 B2 | 4/2006 | Satou et al. | |
| 7,129,679 B2 | 10/2006 | Inaba et al. | |
| 7,280,574 B1 | 10/2007 | Khawshe et al. | |
| 7,391,797 B2 * | 6/2008 | Schrodinger et al. | 372/38.02 |
| 7,560,981 B2 * | 7/2009 | Chao et al. | 327/540 |
| 2004/0114241 A1 * | 6/2004 | Sedlmayr | 359/497 |
| 2004/0263504 A1 * | 12/2004 | Kato | 345/204 |
| 2005/0018715 A1 * | 1/2005 | Varshneya et al. | 372/6 |
| 2005/0073263 A1 * | 4/2005 | Havlik et al. | 315/169.3 |
| 2005/0110469 A1 | 5/2005 | Inaba et al. | |
| 2006/0261754 A1 * | 11/2006 | Lee | 315/291 |
| 2007/0171271 A1 * | 7/2007 | Wey et al. | 347/237 |

FOREIGN PATENT DOCUMENTS

| | | |
|---|---|---|
| JP | 2003317978 | 11/2003 |
| JP | 2005160178 | 6/2005 |
| JP | 2005310997 | 11/2005 |

OTHER PUBLICATIONS

International Preliminary Report on Patentability for International Patent Application No. PCT/US2009/033094 mailed Aug. 19, 2010.
Chenbinglin et al., "The Design of the LD's Driving Circuit in Laser Proximity Fuze System Based on the Double Range Gate Detection," The 11th IEEE International Symposium on Electron Devices for Microwave and Optoelectronic Applications, Nov. 2003, pp. 290-295.

(Continued)

*Primary Examiner* — Alexander Eisen
*Assistant Examiner* — Patrick F Marinelli
(74) *Attorney, Agent, or Firm* — Andrew Viger; Wade J. Brady, III; Frederick J. Telecky, Jr.

(57) ABSTRACT

The invention relates to an apparatus for controlling the output of an LD or LED. The apparatus includes a substantially static bias source and a variable source. The substantially static bias source provides a bias current to the LD/LED. The variable source is capacitively coupled to the LD/LED. The bias current may be provided such that it is higher than a threshold current at which, when provided to an LD, lasing occurs.

19 Claims, 7 Drawing Sheets

(56) References Cited

OTHER PUBLICATIONS

Ji, Chang-Hyeon et al., "Performance of a Raster Scanning Laser Display System Using Diamond Shaped Frame Supported Micromirror," Photonics Technology Letters, IEEE, Aug. 2006, 18(16):1702-1704.

Kim, Jae Hong et al., "Wideband Multiple Resonance Small-Signal Laser Diode Model for the Co-design of Laser Drive Circuits," The 47th IEEE International Midwest Symposium on Circuits and Systems, Jul. 2004, 2:II181-II183.

Kranert, J. et al., "Laser Display Technology," Proceedings of the Eleventh Annual International Workshop on Micro Electro Mechanical Systems, 5 pages.

Mooradian, Aram, "Diode Lasers for Displays," Lasers & Electro-Optics Society, IEEE, Oct. 2006, pp. 328-329.

* cited by examiner

LASER DIODE / LED DRIVE CIRCUIT

TECHNICAL FIELD

The invention is generally directed to the area of luminescence control. The invention is directed, particularly, but not exclusively to a method and an apparatus for controlling the output of a laser diode (LD) or light emitting diode (LED).

BACKGROUND

LDs/LEDs are employed for many applications. For example, illumination devices, opto-isolators, optical communications systems, infrared remote controls, Compact Disc (CD) readers/writers, Digital Versatile Disc (DVD) readers/writers, laser pointers, laser cutters, optical computer mice, laser printers, security systems, video projection systems, display devices, and/or the like, commonly employ LDs/LEDs.

In certain applications, the output of an LD/LED is varied, modulated, controlled, and/or the like. For example, the current provided to an LED may be varied to change the output intensity, output wavelength, and/or other parameter. Also, such control may be employed to control the color and/or intensity provided by an LD video projection system or for providing dynamic contrast, local backlight control, and/or the like, for a liquid crystal display (LCD).

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified. These drawings are not necessarily drawn to scale.

For a better understanding of the present invention, reference will be made to the following Detailed Description, which is to be read in association with the accompanying drawings, wherein.

DETAILED DESCRIPTION

Various embodiments of the present invention will be described in detail with reference to the drawings. Reference to various embodiments does not limit the scope of the invention, which is limited only by the scope of the claims attached hereto. Additionally, any examples set forth in this specification are not intended to be limiting and merely set forth some of the many possible embodiments for the claimed invention.

Throughout the specification and claims, the following terms take at least the meanings explicitly associated herein, unless the context dictates otherwise. The meanings identified below do not necessarily limit the terms, but merely provide illustrative examples for the terms. The meaning of "a," "an," and "the" includes plural reference. References in the singular are made merely for clarity of reading and include plural reference unless plural reference is specifically excluded. The meaning of either "in" or "on" includes both "in" and "on." The term "or" is an inclusive "or" operator, and is equivalent to the term "and/or" unless specifically indicated otherwise. The term "based on" or "based upon" is not exclusive and is equivalent to the term "based, at least in part, on" and includes being based on additional factors, some of which are not described herein. The term "coupled" means at least either a direct electrical connection between the items connected, or an indirect connection through one or more passive or active intermediary devices. The term "circuit" means at least either a single component or a multiplicity of components, either active and/or passive, that are coupled together to provide a desired function or functions. The term "signal" means at least one current, voltage, charge, temperature, data, or other signal. A "signal" may be used to communicate using active high, active low, time multiplexed, synchronous, asynchronous, differential, single-ended, or any other digital or analog signaling or modulation techniques. A "signal" may also be employed to provide and/or transmit power. Where either a field effect transistor (FET) or a bipolar transistor may be employed as an embodiment of a transistor, the scope of the words "gate", "drain", and "source" includes "base", "collector", and "emitter", respectively, and vice versa. The term "light emitting diode" or "LED" includes semiconductor devices which provide an output in the ultraviolet, visible light, or infrared spectrum. As used herein, these include infrared LEDs, ultraviolet LEDs, near-ultraviolet LEDs, visible light LEDs, and/or the like. However, the listed examples are merely provided as a non-limiting example of certain LEDs. The phrase "in one embodiment," as used herein does not necessarily refer to the same embodiment, although it may.

Briefly stated, the invention relates to an apparatus for controlling the output of an LD or LED. The apparatus includes a substantially static bias source and a variable source. The substantially static bias source provides a bias current to the LD/LED. The variable source is capacitively coupled to the LD/LED. The bias current may be provided such that it is higher than a threshold current at which, when provided to an LD, lasing occurs.

Figure 1:
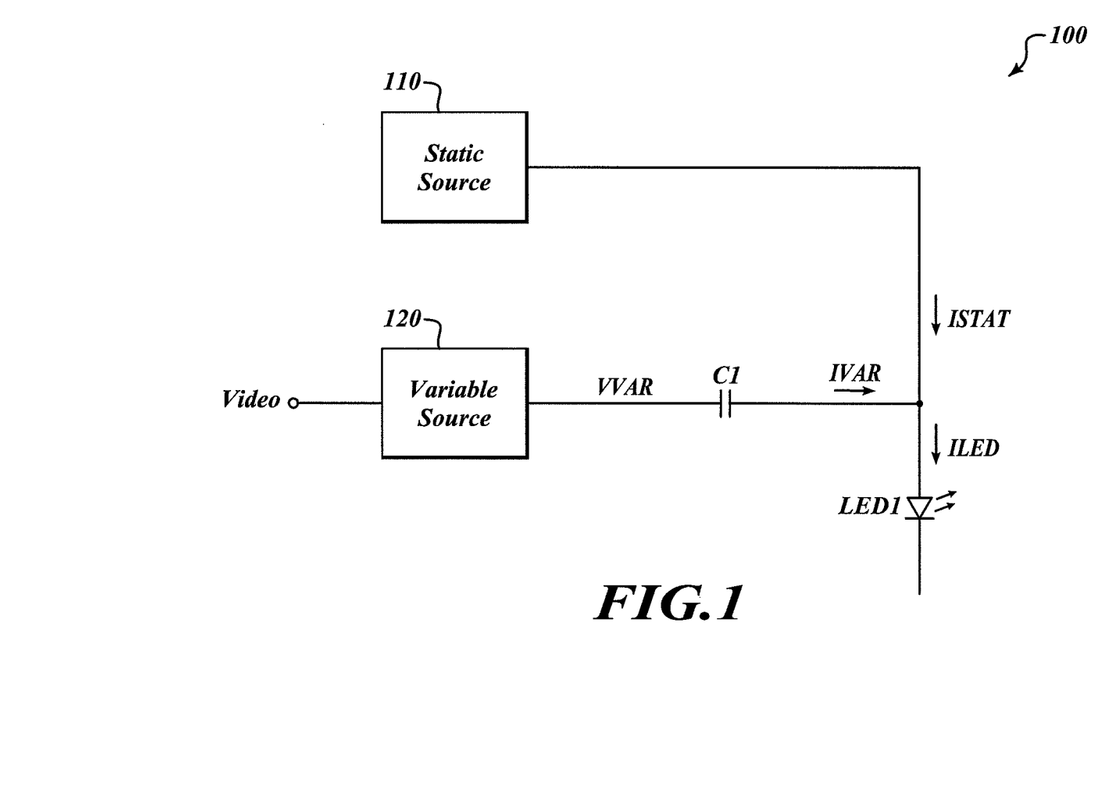
FIG. 1 is a block diagram of an embodiment of an LD/LED system according to aspects of the present invention.

FIG. 1 is a block diagram of an embodiment of LD/LED system 100. System 100 may include static source 110, variable source 120, capacitor C1, and LD/LED LED1.

System 100 is arranged to provide an output from LD/LED LED1 such that the output from LED1 is varied based, at least in part, on signal VIDEO. For example, system 100 may be employed as an LD video projection system, or as part thereof. In another embodiment, system 100 may be employed as a variable backlight for an LCD (e.g., dynamic contrast LED backlight or local backlight control). In yet other embodiments, system 100 may be employed as part of an optical communication system, as part of a variable intensity display device (e.g., laser pointer, LED television, etc.), and/or the like.

In these and other embodiments, LED1 may be selected such that the intensity of the output is varied based, at least in part, on signal VIDEO. However, in other embodiments, LED1 may be selected such that the output wavelength (e.g., color), and/or other parameter is varied based, at least in part, on signal VIDEO.

Also, signal VIDEO may be any type of input signal. For example, signal VIDEO may be a video signal or based on a video signal. Examples of video signals include: a National Television System Committee (NTSC) signal, a Phase Alternating Line (PAL) signal, a Sequentiel couleur a mémoire (SECAM) signal, an Advanced Television Systems Committee (ATSC) signal, a Digital Visual Interface (DVI) signal, a Video Graphics Array (VGA) signal, a High-Definition Media Interface (HDMI) signal, a composite video signal, a luminance video signal (e.g., "Y"), a chrominance video signal (e.g., "C"), a red video signal, a green video signal, or a blue video signal. However, signal VIDEO may also be any internally or externally generated non-video input signal.

In one embodiment, static source 110 is arranged to provide substantially static bias current ISTAT to LED1. The value of bias current IBIAS may be selected based on the particular application and may be provided such that system 100 is arranged to operate LED1 over a substantial portion LED1's operating range by varying variable current IVAR without varying bias current ISTAT. For example, the value of bias current ISTAT may be determined based, at least in part, on the current source/sink capabilities of variable source 120 and capacitor C1, the manufacturer's defined range of input currents for LED1, output range requirements for LED1, power dissipation requirements, and/or the like.

In one embodiment, bias current IBIAS is provided such that it is substantially equal to a half-way point in an operating range for LED1 input currents. Selection of such a value for bias current IBIAS may enable LED1 to be operated throughout its operating range while reducing the average value of variable current IVAR. Also, bias current IBIAS may be provided such that the variable current IVAR is substantially equal to zero amps during at least a portion of an operational period. However, bias current IBIAS may also be selected to be substantially equal to a minimum value of LED1's input current operating range, to a maximum value of LED1's variable current operating range, and/or the like.

If an LD is employed as LED1, bias current IBIAS may be selected such that it is higher than the threshold current at which, when provided to an LD, lasing occurs.

In one embodiment, variable source 120 is arranged to capacitively couple variable current IVAR to LED1 via capacitor C1 by providing variable voltage VVAR. The range of outputs values for variable source 120 may be defined based, at least in part, on the value of bias current IBIAS, the value and type of capacitor C1, manufacturer's defined range of input currents for LED1, output range requirements for LED1, power dissipation requirements, and/or the like. This range of outputs values for variable source 120 is, for example, selected based on the particular application and the selected value of bias current IBIAS. It may be provided such that system 100 can operate LED1 over a substantial portion of LED1's input current range or output range.

Capacitor C1 is arranged to receive voltage VVAR and to provide current IVAR based, at least in part, on a change in voltage VVAR. For example, capacitor C1 may be arranged to capacitively couple voltage VVAR to LED1 via variable current IVAR. Also, capacitor C1 may be any type of capacitor. For example, capacitor C1 may be a ceramic capacitor (e.g., X5R, Y5V, or X7R), tantalum capacitor, electrolytic capacitor, paper capacitor, plastic film capacitor, glass capacitor, and/or the like. Also, capacitor C1 may be formed on a monolithic integrated circuit. Further, the capacitance value of capacitor C1 may be any suitable value. In one embodiment, the capacitance value is selected based, at least in part, on an operating frequency for system 100.

In one embodiment, LD/LED LED1 is a semiconductor device which provides an output in the ultraviolet, visible light, or infrared spectrum when driven with current ILED. In one embodiment, LED1 is an LD. Likewise, LED1 may be an infrared LED, an ultraviolet LED, a near-ultraviolet LED, a visible light LED (any color), and/or any other suitable device.

Also, the cathode of LED1 may be coupled to any suitable circuit or reference potential. For example, the cathode of LED1 may be directly grounded or directly coupled to either a negative or positive voltage. However, the cathode of LED1 may also be coupled to ground or either a negative or positive voltage via a sense circuit, a current limiting circuit, and/or the like. These and other embodiments are within the spirit and scope of the invention.

Figure 2:
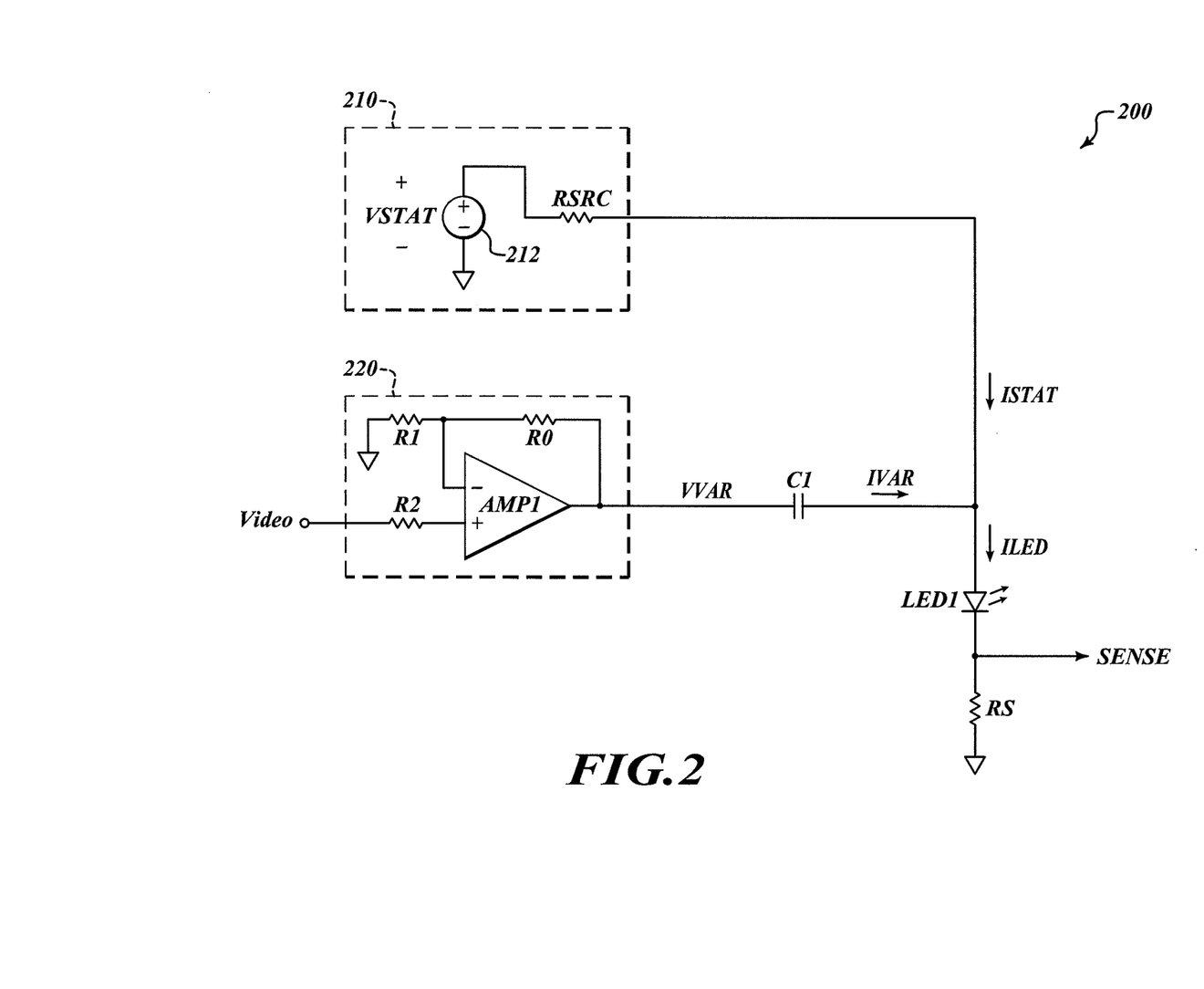
FIG. 2 is a schematic diagram of another embodiment of an LD/LED system according to aspects of the present invention.

FIG. 2 is a block diagram of an embodiment of LD/LED system 200. System 200 may be employed as an embodiment of system 100 of FIG. 1. System 200 may include static source 210, variable source 220, capacitor C1, LD/LED LED1, and sense resistor RS.

In one embodiment, static source 210 is arranged to provide substantially static bias current ISTAT to LD/LED LED1. Also, static source 210 may include voltage source 212 and resistance RSRC.

Voltage source 212 is arranged to provide a substantially static voltage VSTAT such that voltage source 212 and resistance RSRC provides substantially static bias current ISTAT. In one embodiment, voltage source 212 is a switching regulator such as a buck regulator, a boost regulator, a buck-boost regulator, an inverting regulator, a fly-back converter, and/or the like. In other embodiments, voltage source 212 may include a linear regulator, a battery, an AC/DC rectifier, and/or the like. These and other variations are within the spirit and scope of the invention.

Resistance RSRC may be of any suitable type and value. In at least one embodiment, resistance RSRC is the intrinsic source resistance of voltage source 212 and does not include a discrete resistor.

In other embodiments, other circuitry may be employed as static source 210 instead of voltage source 212 and resistance RSRC. For example, a current mirror, a current regulator, a digital-to-analog converter, a trans-conduction amplifier circuit, and/or the like, may be suitably employed instead of voltage source 212 and resistance RSRC.

In one embodiment, variable source 220 is arranged to provide voltage VVAR and to capacitively couple variable current IVAR to LED1. Variable source 220 may include resistors R0-R2 and amplifier AMP1. As illustrated, variable source 220 is arranged as a non-inverting operation amplifier circuit that, in operation, provides voltage VVAR such that voltage VVAR is substantially proportional to signal VIDEO. Any suitable values for resistors R0-R2 may be selected to define the gain of variable source 220.

In other embodiments, other circuitry may be employed instead of, or in conjunction with, resistors R0-R2 and amplifier AMP1. For example, a digital-to-analog converter, a differential amplifier, an instrumentation amplifier, and/or the like, may be suitably employed.

Sense resistor RS is arranged such that the voltage of signal SENSE is proportional to the value of current ILED through LED1. In other embodiments, other circuits such as magnetic flux sensors, current mirror circuits, analog-to-digital converters, photodiodes, and/or the like, may be employed to provide signal SENSE instead of, or in addition to, sense resistor RS. These and other variations are within the spirit and scope of the invention. Signal SENSE is discussed in further detail below, for one embodiment.

Capacitor C1 and LED1 may be employed as embodiments of capacitor C1 and LED1 of FIG. 1.

Figure 3:
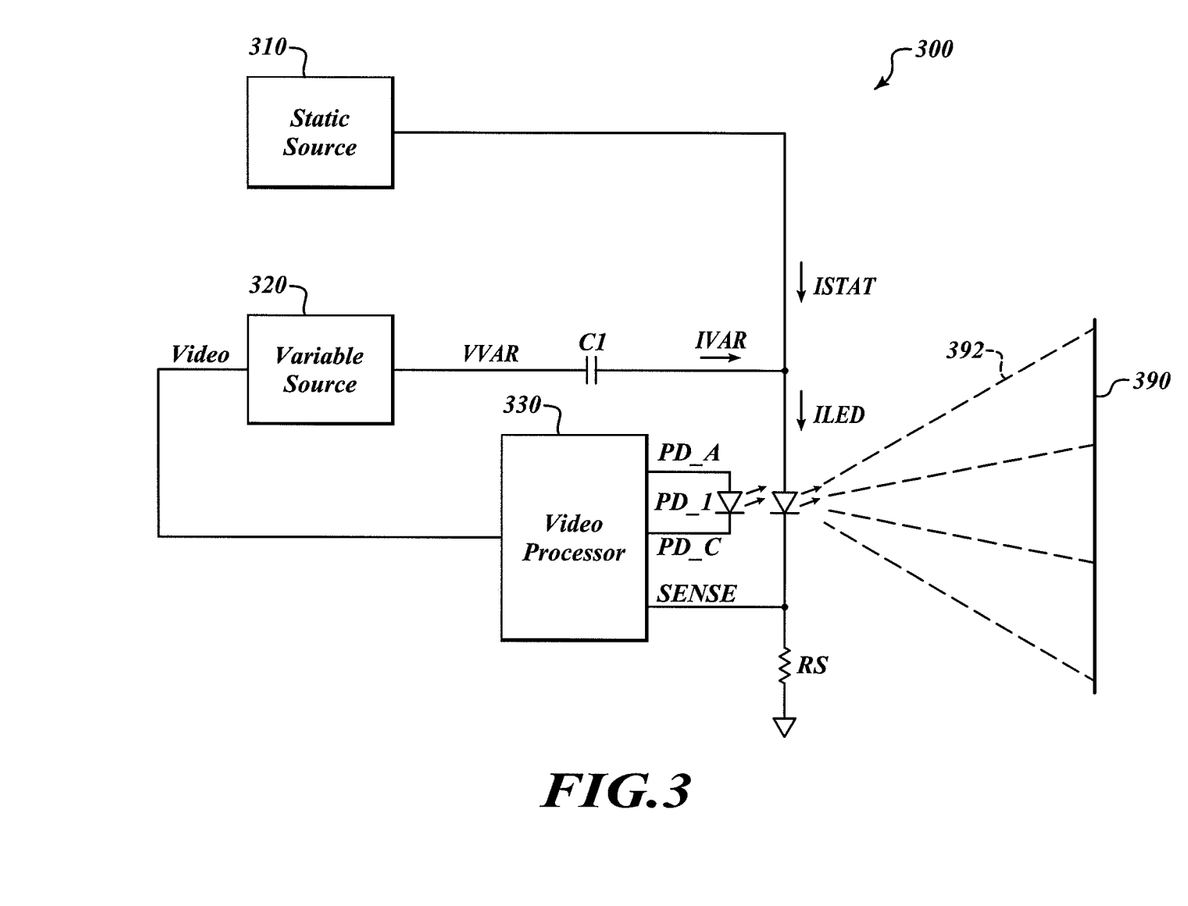
FIG. 3 is a schematic diagram of yet another embodiment of an LD/LED system according to aspects of the present invention.

FIG. 3 is a block diagram of an embodiment of LD/LED system 300. System 300 may be employed as an embodiment of system 100 of FIG. 1. System 300 may include static source 310, variable source 320, video processor 330, capacitor C1, LD/LED LED1, photodiode PD1, sense resistor RS, and screen 390.

System 300 is arranged to project light 392 onto screen 390 to provide a video image, for example, as part of a video projector system. Also, system 300 may be employed as part of a portable video projector for devices such as mobile telephones, portable computers, personal digital assistants, DVD players, portable media devices, and/or the like. However, system 300 may be employed in other front or rear projection systems.

Static source 310, variable source 320, capacitor C1, and LED1 may be employed as respective embodiments of static source 110, variable source 120, capacitor C1, and LED1 of FIG. 1.

In one embodiment, photodiode PD1 is arranged to sense the output of LED1 and to provide signals PD_A and PD_C to video processor 330 based, at least in part, on the sensed output of LED1. Photodiode PD1 may be any type of photodiode. For example, PN junction photodiodes, PIN structure photodiodes, avalanche photodiodes, and/or the like, may be suitably employed. In addition, charge couple devices, photodetectors, phototransistors, and/or the like, may be employed instead of, or in conjunction with, photodiodes.

Sense resistor RS may be employed as an embodiment of sense resistor RS of FIG. 2.

Video processor 330 is arranged to receive signals PD_A, PD_C, and SENSE, and to provide signal VIDEO based, in part, on the received signals. In one embodiment, video processor 330 includes analog to digital converters (ADCs) to receive and digitize signals PD_A, PD_C, and SENSE (not shown). Also, video processor 330 may employ the received signals to compensate for the effects of temperature, ambient lighting, changes in static source 310 output, and/or the like, in providing signal VIDEO to variable source 320. Further video processor 330 may be arranged to employ the received signals to provide current and/or voltage limiting. Video processor 330 may include video decoders, synchronization circuits, motion compensation circuitry, filters, interlacing/deinterlacing circuits, upscaling/downscaling circuits, and/or the like (not shown).

In other embodiments, photodiode PD1 and/or sense resistor RS may be omitted. For example, video processor 330 may be arranged to receive sense signal(s) from photodiode PD1 or from sense resistor RS instead of from both.

In addition, video processor 330 is further arranged to provide signal VIDEO based, in part, on video data such as, for example, Motion Picture Experts Group (MPEG) data, television data, computer graphics data, still image data, and/or the like. Also, the video data may be received from any source. For example, the video data may be pre-loaded onto video processor, read from a DVD, read from other storage media, received from a streaming source, received over a wireless network connection, received from an image capture device, be locally generated, and/or the like.

Screen 390 may be virtually any surface onto which light may be projected. For example, 390 may be a wall, fabric, paper, and/or the like. Also, screen 390 may be painted or unpainted. In one embodiment, screen 390 is a white or silver painted surface onto which light may be projected for viewing.

In other embodiments, system 300 may include additional components. For example, lenses, mirrors, filters, and/or the like, may also be employed to project a video image. Likewise, if an LD/LED system is employed as a backlight system for an LCD display, diffusers, other lenses, filters, and/or the like, may also be employed to provide a video image. In yet another embodiment, an LD/LED system may be arranged to project a video image onto a transparent surface, translucent surface, or onto a user's eye to provide, for example, a heads up display. These and other variations are within the spirit and scope of the invention.

Figure 4:
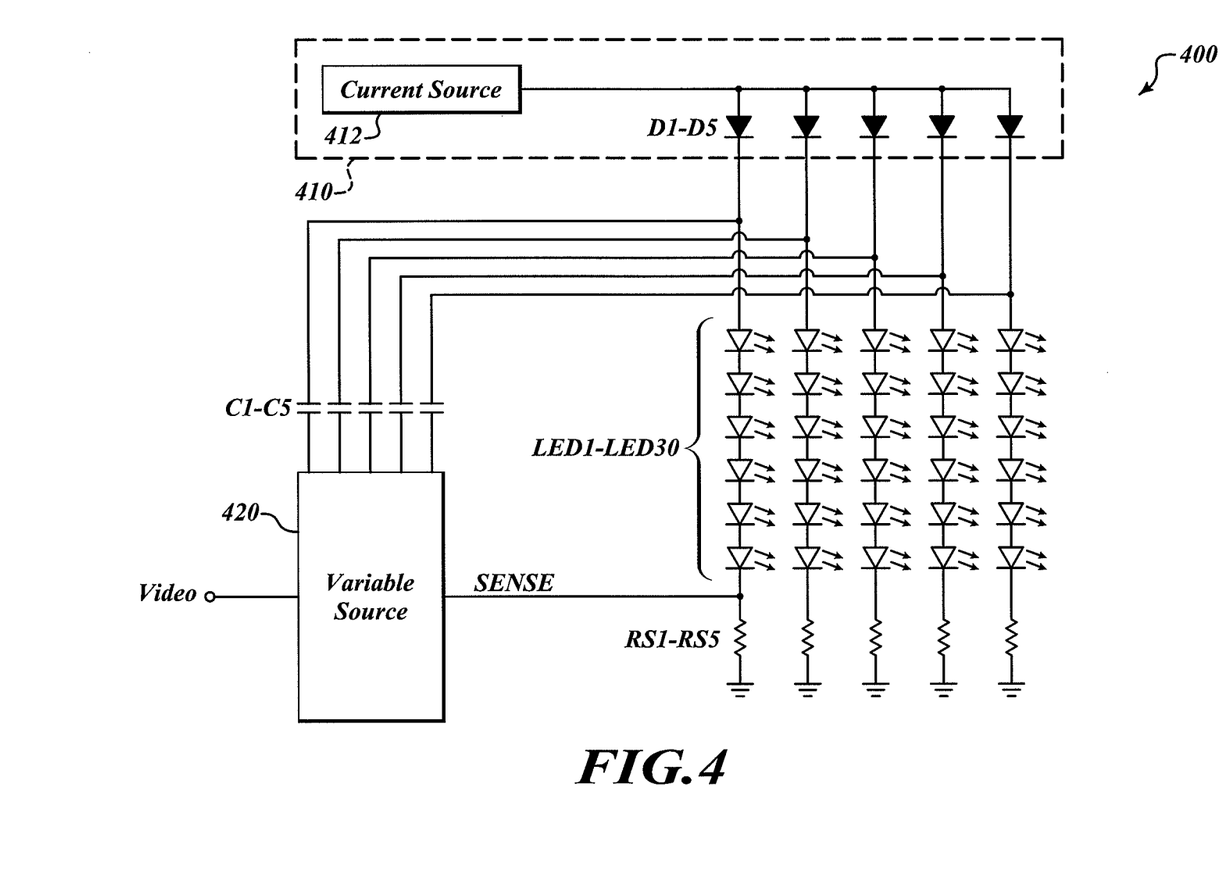
FIG. 4 is a block diagram of an additional embodiment of an LD/LED system according to aspects of the present invention.

FIG. 4 is a block diagram of an embodiment of LD/LED system 400. System 400 may be employed as an embodiment of system 100 of FIG. 1. System 400 may include static source 410, variable source 420, capacitors C1-C5, LDs/LEDs LED1-LED30, and sense resistors RS1-RS5.

System 400 is arranged as a multiple LD/LED system that is arranged to provide outputs from LDs/LEDs LED1-LED30 based, at least in part, on signal VIDEO. In system 400, LED1-LED30 are arranged as five strings of six LDs/LEDs each. However, in other embodiments, any number of LDs/LEDs, any number of strings, or any number of LDs/LEDs per string may be employed. Each of LED1-LED30 may be employed as an embodiment of LED1 of FIG. 1.

Static source 410 is arranged to provide substantially static bias currents to each of the LD strings of system 400. In addition, static source 410 includes current source 412 and blocking diodes D1-D5. In one embodiment, current source 412 is employed as an embodiment of static source 110 of FIG. 1. Also, in one embodiment, each of diodes D1-D5 corresponds to one of the strings of system 400 and is arranged to block the variable currents corresponding to the other strings from cross-coupling onto its corresponding string. For example, blocking diodes D1-D5 enable substantially static bias currents to be provided to LED1-LED30 from a shared relatively low-impedance current source such as current source 412.

However, in another embodiment, separate current sources are employed to provide bias currents to each string. In such an embodiment, diodes D1-D5 may be omitted.

Variable source 420 is arranged to receive signal VIDEO, to receive signal SENSE, and to capacitively couple variable currents to each of the strings based, at least in part, on signal VIDEO and signal SENSE. In one embodiment, variable source 420 is arranged such that the variable currents to each string are substantially the same. However, in other embodiments, the variable currents to each string are provided such that are not substantially the same (e.g., to provide dynamic contrast, local backlight control, and/or the like).

Each of capacitor C1-C5 may be employed as embodiments of capacitor C1 of FIG. 1. In one embodiment, each of capacitors C1-C5 corresponds to one of the strings of system 400 and is arranged to capacitively couple its corresponding string to variable source 420.

Each of sense resistors RS1-RS5 may be employed as embodiments of sense resistor RS of FIG. 2. In one embodiment, each of sense resistors RS1-RS5 corresponds to one of the strings of system 400. Although only a single sense signal is provided to variable source 420, in other embodiments, any number of sense signals may be provided.

Figure 5:
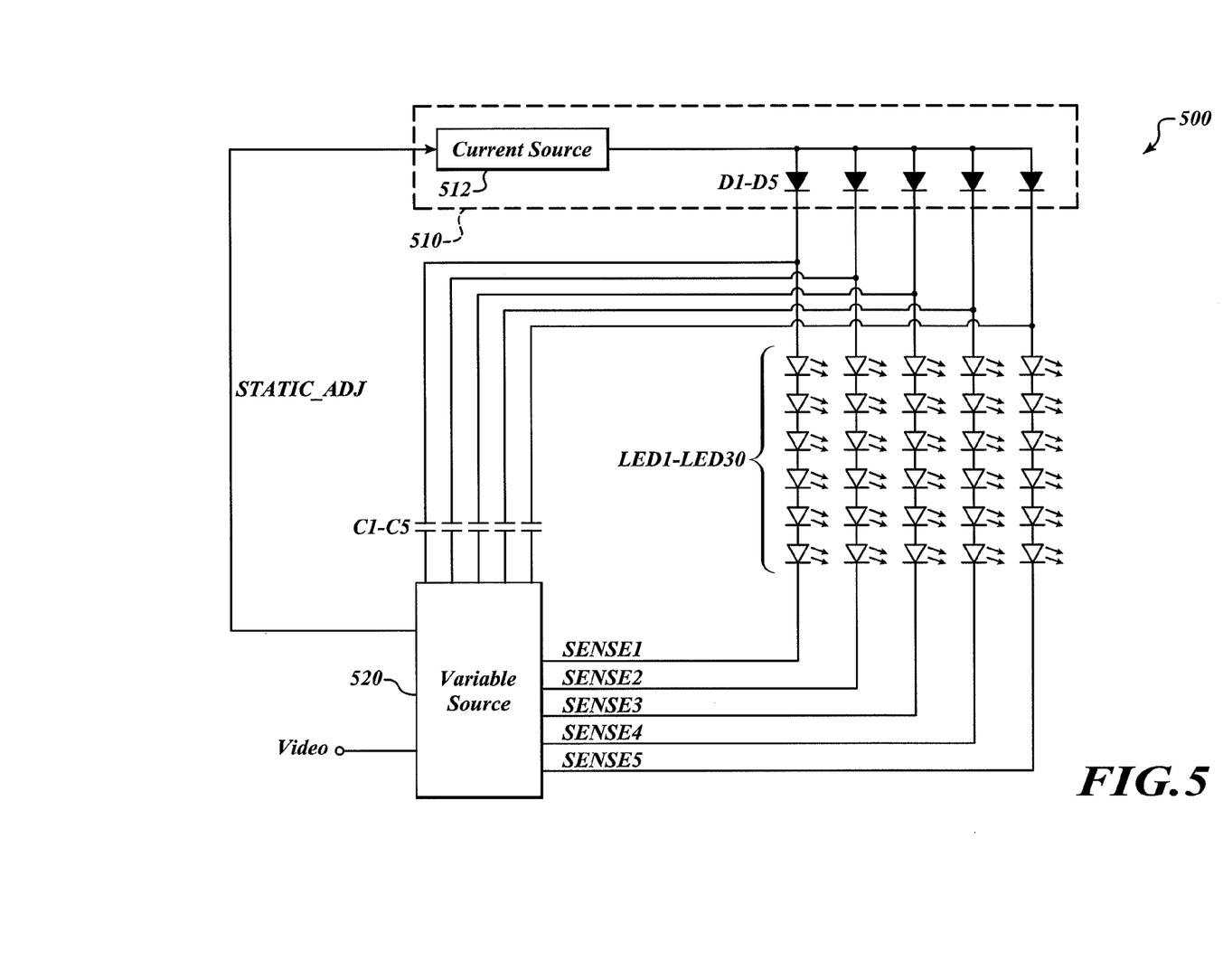
FIG. 5 is a block diagram of another additional embodiment of an LD/LED system according to aspects of the present invention.

FIG. 5 is a block diagram of an embodiment of LD/LED system 500. System 500 may be employed as an embodiment of system 100 of FIG. 1. System 500 may also be employed as an embodiment of system 400 of FIG. 4. System 500 may include static source 510, variable source 520, capacitors C1-C5, and LDs/LEDs LED1-LED30.

System 500 is arranged to such that the current through each string may be individually sensed.

Static source 510 may include current source 512 and blocking diodes D1-D5. Diodes D1-D5 may be employed as embodiments of diodes D1-D5 of FIG. 4. Current source 512 is arranged to receive signal STATIC_ADJ and to provide substantially static bias currents to each string of system 500. In one embodiment, current source 512 is arranged to adjust the bias currents to each of the strings based, at least in part, on a value of signal STATIC_ADJ. In another embodiment, current source 512 is arranged to provide the bias currents to each of the strings such that the bias currents are substantially proportional to a value of signal STATIC_ADJ.

In one embodiment, variable source 520 is arranged to receive sense signals SENSE1-SENSE5, to receive signal VIDEO, to provide signal STATIC_ADJ, and to capacitively couple variable currents to each string of system 400. In one embodiment, variable source 520 includes a current controlled current source, current controlled voltage source, current sense transformer, current sense relay, current sense amplifier, magnetic flux sensors, and/or the like, and combinations thereof, to individually sense the current on each of signals SENSE1-SENSE5.

Likewise, variable source 520 may also be arranged to provide static current adjustment signal STATIC_ADJ to current source 512 of static source 510. In one embodiment, signal STATIC_ADJ is provided by variable source 520 based, at least in part, upon signal VIDEO and signals SENSE1-SENSE5. For example, signal STATIC_ADJ may be provided to adjust the static currents provided to each of the strings such that the variable currents provided by variable source 520 may be reduced while providing outputs from LED1-LED30 to as represented by signal VIDEO.

Variable source 520 may also be arranged to provide signal STATIC_ADJ such that signal STATIC_ADJ is based on an average error between each of signals SENSE1-SENSE5 and the value for each signal that is represented by signal VIDEO. In such an embodiment, an error amplifier circuit, comparison circuits, summing circuits, and/or the like, and combinations thereof, may be employed to provide signal STATIC_ADJ.

Capacitors C1-C5 and LED1-LED30 may be employed as embodiments of capacitors C1-C5 and LED1-LED30 of FIG. 4.

Figure 6:
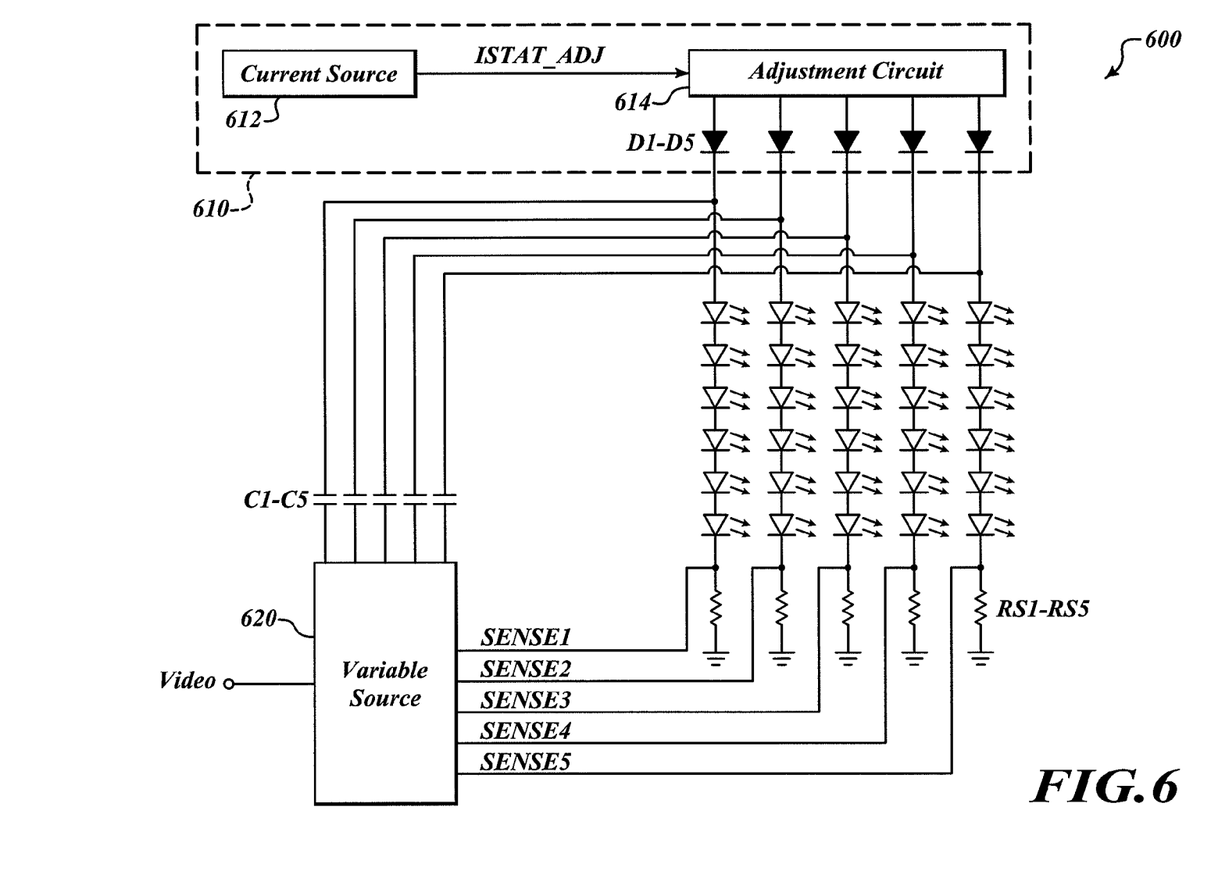
FIG. 6 is a block diagram of yet another additional embodiment of an LD/LED system according to aspects of the present invention.

FIG. 6 is a block diagram of an embodiment of LD/LED system 600. System 600 may be employed as an embodiment of system 100 of FIG. 1. System 600 may include static current source 610, variable current source 620, capacitors C1-C5, LDs/LEDs LED1-LED30, and sense resistors RS1-RS5.

System 600 is arranged such that the bias current to each string may be individually adjusted and such that the current through each string may be individually sensed.

Static source 610 may include current source 612, adjustment circuit 614 and blocking diodes D1-D5. Diodes D1-D5 may be employed as embodiments of diodes D1-D5 of FIG. 4. However, diodes D1-D5 are optional and are omitted in at least one embodiment. Current source 612 is arranged to provide a substantially current ISTAT_ADJ to adjustment circuit 614. In one embodiment, current source 612 is employed as an embodiment of static source 110 of FIG. 1.

In one embodiment, adjustment circuit 614 is arranged to receive substantially current ISTAT_ADJ and to individually provide bias currents to each string of system 600. For example, adjustment circuit 614 may be arranged to adjust the bias currents to each string based, at least in part, on factors such as the value of signals SENSE1-SENSE5, differing numbers of LDs/LEDs in each string, different power requirements, and/or the like. Also, adjustment circuit 614 may adjust the bias currents to each string based, at least in part, on the parameters of the LDs/LEDs within each string. For example, these parameters include the color, intensity, current thresholds, voltage thresholds, brightness, tolerance, and/or the like, of the LDs/LEDs within each string. This bias current adjustment to each string may be configured based, for example, on the bin codes, rank codes, and/or the like, as provided or indicated by the LD/LED manufacturer.

In other embodiments, the current to each LD/LED string may be individually adjusted or controlled by employing separate static sources, employing separate current sources within a single static source, employing separate variable sources, employing duty cycle control switches to separately control current to each LD/LED string, and/or the like. These and other variations are within the spirit and scope of the invention.

Variable source 620 is arranged to receive signal VIDEO, to receive signals SENSE1-SENSE5, and to capacitively couple variable currents to each of the strings based, at least in part, on signal VIDEO and signals SENSE1-SENSE5.

Capacitors C1-C5, sense resistors RS1-RS5, and LED1-LED30 may be employed as embodiments of capacitors C1-C5, sense resistors RS1-RS5, and LED1-LED30 or FIG. 4.

Figure 7A:
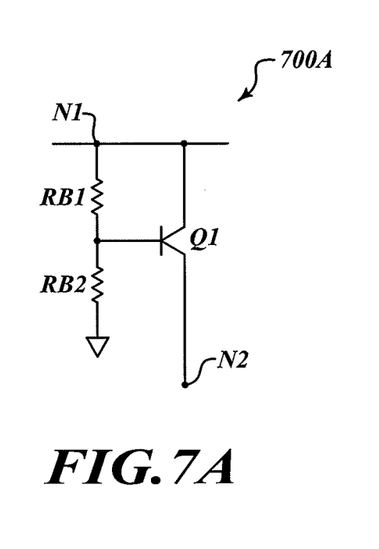
FIGS. 7A-7B are schematic diagrams of reverse current blocking circuits according to aspects of the present invention.
Figure 7B:
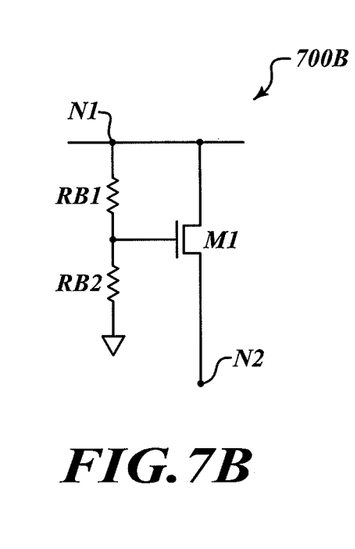

FIGS. 7A-7B are schematic diagrams of reverse current blocking circuits according to aspects of the present invention.

Circuit 700A may include resistors RB1 and RB2 and bipolar junction transistor Q1. Circuit 700B may include resistors RB1 and RB2 and field effect transistor M1. Each of circuits 700A and 700B may be employed as reverse current blocking circuits as a substitute for, or in conjunction with, each of diodes D1-D5 of FIGS. 4-6. For example, in systems 400, 500, or 600, node N1 may be coupled in place of the anodes of each of diodes D1-D5 and node N2 may be coupled in place of the cathodes of each of diodes D1-D5. Also, while in FIGS. 7A and 7B, resistor RB2 is coupled to ground, in other embodiments, resistor RB2 may be coupled to any other suitable voltage.

Other reverse current blocking circuits may also be employed instead of diodes D1-D5 or circuits 700A and 700B. As discussed above, reverse current blocking circuits may be omitted in some embodiments.

The above specification, examples and data provide a description of the method and applications, and use of the invention. Since many embodiments of the invention can be made without departing from the spirit and scope of the invention, this specification merely set forth some of the many possible embodiments for the invention.

What is claimed as new and desired to be protected by Letters Patent of the United States is:

1. A circuit for providing a video image, comprising:
   a plurality of laser diode (LD) strings, wherein each LD string includes one or more LDs;
   a bias source that is arranged to provide a plurality of substantially static bias currents, wherein each bias current of the plurality of bias currents corresponds with, and is provided to, one LD string of the plurality of LD strings;
   a variable source that is capacitively coupled to each LD string of the plurality of LD strings and is arranged to capacitively couple a plurality of variable currents to the plurality of LD strings, wherein each variable current of the plurality of variable currents corresponds with, and is capacitively coupled to, one LD string of the plurality of LD strings, and wherein the output intensity of each LD of each LD string is based, at least in part, on the variable currents to each LD string; and a video processor that is arranged to provide a video signal to the variable source based, at least in part, on video data such that the plurality of variable currents is based, at least in part, on the video signal.

2. The circuit of claim 1, wherein the bias source includes:
a plurality of blocking diodes that are arranged to block the variable currents corresponding to each LD string of the plurality of LD strings from cross-coupling to the other LD string(s) of the plurality of LD strings.

3. The circuit of claim 1, wherein the bias source includes adjustment circuitry configured to individually adjust the substantially static bias currents provided to respective ones of the plurality of LD strings.

4. The circuit of claim 1, wherein the plurality of LD strings, the bias source, and the variable source are arranged to project a video image onto a screen.

5. The circuit of claim 1, further comprising:
a plurality of capacitors, wherein each capacitor of the plurality of capacitors corresponds with one LD string of the plurality of LD strings, and wherein each capacitor of the plurality of capacitors is arranged to capacitively couple the variable currents corresponding with the LD string of the plurality of LD strings to the LD string.

6. The circuit of claim 1, wherein the video signal is based, at least part, on one of a National Television System Committee (NTSC) signal, a Phase Alternating Line (PAL) signal, a Sequentiel couleur a memoire (SECAM) signal, an Advanced Television Systems Committee (ATSC) signal, a Digital Visual Interface (DVI) signal, a Video Graphics Array (VGA) signal, a High-Definition Media Interface (HDMI) signal, a composite video signal, a luminance video signal, a chrominance video signal, a red video signal, a green video signal, or a blue video signal.

7. A circuit for controlling laser diode (LD) output intensity, comprising:
an LD;
a bias source that is arranged to provide a substantially static bias current to the LD;
a variable source that is capacitively coupled to the LD and is arranged to capacitively couple a variable current to the LD, wherein the intensity of the LD's output is based, at least in part, on the variable current to the LD; and
a video processor that is arranged to provide a video signal to the variable source based, at least in part, on video data such that the variable current is based, at least in part, on the video signal.

8. The circuit of claim 7, wherein the bias source includes at least one of a current mirror, a switching regulator, or a linear regulator, and wherein the bias current source is arranged such that the substantially static bias current is substantial equal to a threshold current of the LD.

9. The circuit of claim 7, wherein the variable source is arranged such that for at least a portion of an operational period, the variable current is substantially equal to zero amps.

10. The circuit of claim 7, wherein the bias source and the variable source are arranged such that during operation the sum of the substantially static bias current and the variable current is always higher than a threshold current of the LD.

11. The circuit of claim 7, wherein the LD arranged to provide visible light which forms, at least in part, a projected video image.

12. The circuit of claim 7, further, comprising:
another LD;
another bias source that is arranged to provide another substantially static bias current to the other LD; and
another variable source that is capacitively coupled to the other LD and is arranged to capacitively couple another variable current to the other LD.

13. The circuit of claim 7, further comprising:
a capacitor that is arranged to receive a capacitor input signal and to provide the variable current to the LD based, at least in part, on capacitively coupling the capacitor input signal to the LD.

14. The circuit of claim 13, wherein the variable source includes:
an operational amplifier circuit that is arranged in a non-inverting configuration and that is further arranged to receive an amplifier input signal and to provide the capacitor input signal such that the capacitor input signal is proportional to the amplifier input signal.

15. The circuit of claim 14, wherein the amplifier input signal is based, at least part, on one of a composite video signal, a luminance video signal, a chrominance video signal, a red video signal, a green video signal, or a blue video signal.

16. A circuit for controlling light emitting diode (LED) output intensity, comprising:
an LED;
a bias source that is arranged to provide a substantially static bias current to the LED;
a variable source that is capacitively coupled to the LED and is arranged to capacitively couple a variable current to the LED, wherein the intensity of the LED's output is based, at least in part, on the variable current to the LED; and
a video processor that is arranged to provide a video signal to the variable source based, at least in part, on video data such that the variable current is based, at least in part, on the video signal.

17. The circuit of claim 16, wherein the LED is arranged to illuminate a liquid crystal display (LCD).

18. The circuit of claim 16, further comprising:
a capacitor that is arranged to receive a capacitor input signal and to provide the variable current to the LED based, at least in part, on capacitively coupling the capacitor input signal to the LED, and wherein the variable source includes:
an operational amplifier circuit that is arranged in a non-inverting configuration and that is further arranged to receive an amplifier input signal and to provide the capacitor input signal such that the capacitor input signal is proportional to the amplifier input signal.

19. The circuit of claim 18, wherein the amplifier input signal is based, at least part, on one of a composite video signal, a luminance video signal, a chrominance video signal, a red video signal, a green video signal, or a blue video signal.

* * * * *